United States Patent [19]
Keck

[11] Patent Number: 5,519,273
[45] Date of Patent: May 21, 1996

[54] FITTING FOR COUPLING AN ELECTRIC MOTOR AND A MOTOR LEAD PROTECTIVE CONDUIT

[75] Inventor: Arthur C. Keck, Fort Wayne, Ind.

[73] Assignee: General Electric Company, Fort Wayne, Ind.

[21] Appl. No.: 302,609

[22] Filed: Sep. 8, 1994

[51] Int. Cl.$^6$ .................................................. H02K 11/00
[52] U.S. Cl. ................................................ 310/71; 310/89
[58] Field of Search .................................. 310/71, 68 R, 310/87–89, 239, 249; 174/65 R; 285/158, 159, 285

[56] References Cited

U.S. PATENT DOCUMENTS

| | | | |
|---|---|---|---|
| 1,775,128 | 9/1930 | Hunter | 174/65 |
| 1,830,276 | 11/1931 | Hunter | 174/65 |
| 2,004,866 | 6/1935 | Haldeman | 103/87 |
| 3,283,186 | 11/1966 | Perry | 310/71 |
| 3,324,228 | 6/1967 | Larsson | 174/65 |
| 3,384,393 | 5/1968 | Horton et al. | 285/158 |
| 3,482,128 | 12/1969 | Keck et al. | 310/71 |
| 3,502,917 | 3/1970 | Bizoe | 310/71 |
| 3,544,705 | 12/1970 | Winston | 174/75 |
| 3,814,961 | 6/1974 | Nelson et al. | 310/87 |
| 3,895,177 | 7/1975 | Muslin | 174/48 |
| 3,992,044 | 11/1976 | Muslin | 285/92 |
| 4,101,794 | 7/1978 | Miller et al. | 310/71 |
| 4,103,101 | 7/1978 | Maier | 174/65 |
| 4,232,712 | 11/1980 | Squires | 138/109 |
| 4,248,459 | 2/1981 | Pate et al. | 285/319 |
| 4,302,035 | 11/1981 | Ochwat | 285/285 |
| 4,494,779 | 1/1985 | Neff et al. | 285/159 |
| 4,523,117 | 6/1985 | Daniels | 310/71 |
| 4,616,105 | 10/1986 | Borsh | 174/65 |
| 4,626,720 | 12/1986 | Fukasaku et al. | 310/62 |
| 4,711,974 | 12/1987 | Borsh | 174/65 |
| 4,781,726 | 11/1988 | Fisher et al. | 29/596 |
| 4,851,725 | 7/1989 | Keck | 310/71 |
| 4,864,080 | 9/1989 | Fochler et al. | 174/65 |
| 4,897,571 | 1/1990 | Isozumi | 310/239 |
| 4,965,478 | 10/1990 | Kobayashi et al. | 310/249 |
| 5,086,243 | 2/1992 | Hofmann | 310/68 |
| 5,086,244 | 2/1992 | Isozumi | 310/89 |
| 5,148,073 | 9/1992 | Tamura | 310/239 |
| 5,189,258 | 2/1993 | Pratesi | 174/65 |
| 5,350,960 | 9/1994 | Kiri et al. | 310/71 X |

FOREIGN PATENT DOCUMENTS

| | | |
|---|---|---|
| 1125027 | 3/1962 | Germany . |
| 125051 | 9/1980 | Japan . |
| 56-41746 | 4/1981 | Japan . |
| 200456 | 12/1965 | Sweden . |
| 1422282 | 7/1988 | U.S.S.R. . |

OTHER PUBLICATIONS

Carflex® Liquidtight Flexible Nonmetallic Conduit –Flex™ Extra Flexible Nonmetallic Tubing Liquidtight Nonmetallic Fittings.

*Primary Examiner*—Mark O. Budd
*Attorney, Agent, or Firm*—Ralph E. Krisher, Jr.

[57] ABSTRACT

The present invention relates to an assembly for protecting motor leads extending between an electric motor shell and an external control unit or power source. The present invention in one form includes a fitting configured for insertion into a notch formed in a motor shell and for coupling to a plastic conduit or sheath which protects the motor leads. The fitting includes a boss and a notch interfitting portion. An opening formed in the boss and interfitting portion is sized to have motor leads extend therethrough. A groove formed in the interfitting portion is sized to have inserted therein the walls forming the notch in the motor shell. The outer diameter of the fitting boss is sized to be inserted into a flexible plastic conduit. Protuberances, such as partial threads, on the exterior surface of the boss provide that when the boss in inserted into the flexible conduit, the boss is not easily separated from the conduit, even at elevated operating temperatures. The motor leads extend, for example, from the motor stator, through the fitting opening, into the flexible conduit, and to an external control unit or power source. The flexible conduit may extend the entire length of the leads between the fitting and the control unit or power source housing. The fitting and conduit protect the internal motor components and the motor leads against exposure to water, oil and dirt.

24 Claims, 1 Drawing Sheet

U.S. Patent May 21, 1996 5,519,273
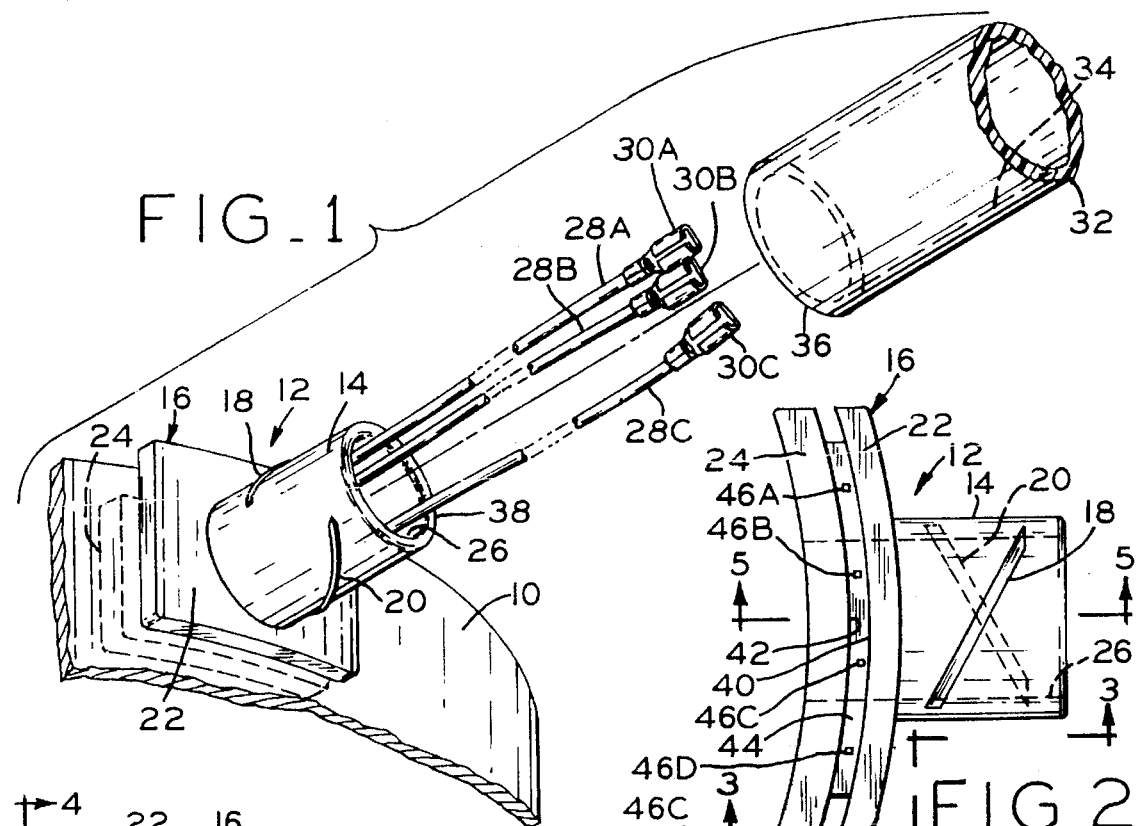
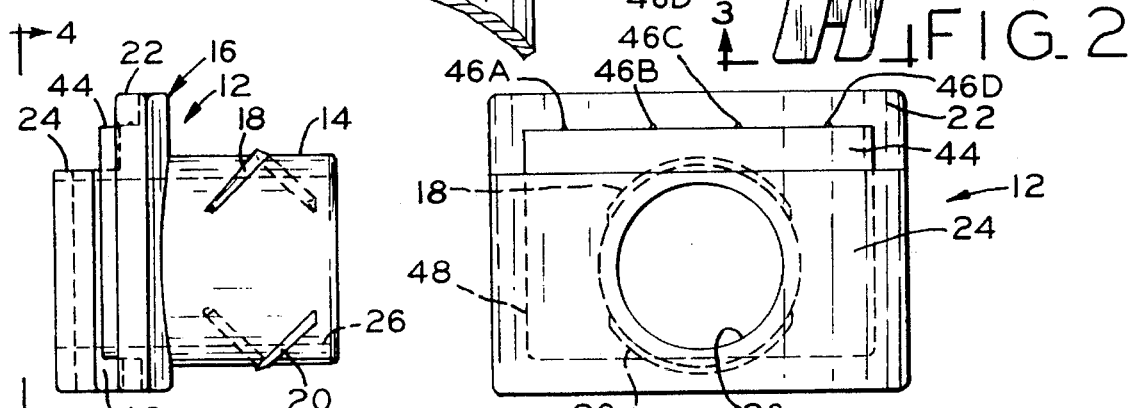
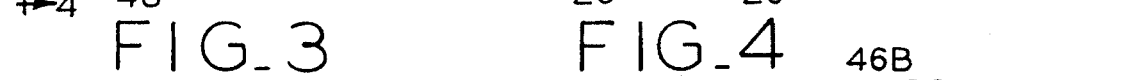
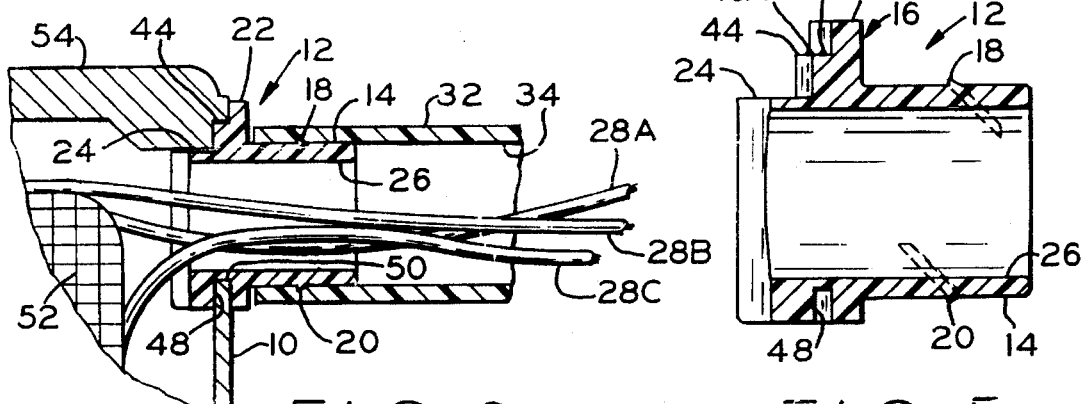

FITTING FOR COUPLING AN ELECTRIC MOTOR AND A MOTOR LEAD PROTECTIVE CONDUIT

FIELD OF THE INVENTION

This invention relates generally to an assembly for protecting motor leads extending between an electric motor shell and an external control unit or power source and, more particularly, to a fitting configured for insertion into a notch formed in the motor shell and for coupling to a plastic conduit or sheath which protects the leads from exposure to water, oil and dirt.

BACKGROUND OF THE INVENTION

Dynamoelectric machines such as small electric motors typically include a stator assembly having one or more windings, a rotor assembly rotatably mounted within the stator assembly, a shell or housing surrounding the stator assembly, and a motor endshield closing one end of the motor. The rotor assembly includes a rotating shaft which is supported in bearings. Such an electric motor is described in Keck et al., U.S. Pat. No. 3,482,128 which is assigned to the present assignee and incorporated by reference herein.

To connect the stator windings to an external power source, conductors usually are inserted through a notch formed in the motor shell. The conductors are connected at one end to the stator windings and the other end of the conductors are connected to the power source. The conductors are, of course, insulated by a plastic or rubber coating. As used herein, the term "motor leads" refers to such insulated conductors.

Although forming a notch in the motor shell is required for providing power to the stator from an external power source, the notch results in the undesirable consequence of potentially exposing the motor components to adverse external elements such as water, dirt and oil. Water, for example, could seep into the motor through the notch and damage the motor components.

In many electric motor applications, and in addition to protecting the motor components from exposure to water, dirt and oil, protecting the motor leads from such exposure also is desirable. Specifically, the portions of the leads extending within the motor housing and from the motor stator to the opening or notch formed in the motor shell are protected by the motor housing. The portions of the leads which are contained within the control unit or power source housing may be protected by such housing. The portions of the leads which extend between the motor shell and the control unit or power source housing, however, are exposed and usually require protection. If such portions of the leads are not protected, then the lead insulation may deteriorate and possibly expose the conductors. Such a condition is highly undesirable and could result in inoperability of the motor.

One form of motor lead protection is to increase the lead insulation thickness. Such thick insulation is more expensive than thinner lead insulation and results in increasing the cost of the motor. In addition, although such thick insulation may cover a portion of the notch formed in the motor shell, such thick insulation generally does not prevent water, dirt and oil from entering into the motor housing.

Other forms of protection include utilizing a hard molded plastic conduit, a semi-flexible metallic conduit, or a formed metal channel, sometimes referred to in the art and herein as "raceways", to protect the motor leads and partially cover the notch in the motor shell. One end of such a conduit or raceway may be inserted into the motor shell notch and the other end of the conduit or raceway may be brought into direct contact with the power source or control unit housing. The motor leads are disposed within the conduit or raceway.

With these forms of protection, one end of the conduit or raceway is inserted into the motor shell notch or is in close proximity to the notch. Such conduit or raceway end may be formed so as to cover a substantial portion of the notch. Substantially covering the notch provides some resistance against water, dirt or oil entering into the motor through the notch. However, water, dirt and oil may still rather easily pass through the notch and into the motor housing.

Manufacturing hard molded plastic conduits, metallic conduit and raceways also is expensive, and such conduits and raceways generally are not flexible enough for use in many applications. For example, since the length of the hard molded plastic conduit is fixed, in applications where the motor is disposed at a distance from the control unit which is greater than the conduit fixed length, a different conduit must be utilized to provide full lead length protection.

Terminal block assemblies for use with leadless motors also are utilized in coupling motor leads to external power sources or control units. An example of such an assembly is described in Keck, U.S. Pat. No. 4,851,725 which is assigned to the present assignee and incorporated by reference herein. With terminal block assemblies, a plurality of spaced apart motor leads and terminals are mounted in a terminal block housing. The terminal block housing receives a mating connector which is coupled to the external power source. Terminal block assemblies are useful in a variety of applications, however, such assemblies and the required mating conductors are expensive to manufacture. Also, although the terminal block assembly does protect the motor components from external conditions, the motor leads are exposed. To protect the leads in such an assembly, a separate sheath normally is utilized.

Commercially available couplings and conduits utilized to provide protection for wires also are known. For example, couplings available from Carlon, 25701 Science Park Drive, Cleveland, Ohio 44122, and sometimes referred to as Carflex® couplings, are utilized in applications such as protecting house wiring. Such couplings generally are molded from PVC and include a central member and completely threaded opposed bosses integrally formed therewith. An opening is formed through coupling to define a passage. One completely threaded boss is connected, for example, to an outdoor switching box and the other completely threaded boss is engaged to a conduit such as Carflex® conduit commercially available from Carlon or some other flexible conduit such as Liqua-tite® conduit available from Electri-flex Company, 222 West Central Avenue, Roselle, Ill. 60172. Since the fully threaded boss is connected to the conduit, the conduit typically must be fully rotated a number of times over the thread to provide full engagement. The connections are made utilizing, for the conduit, a sealing ring and a compression nut and, for the switching box, an o-ring and a lock nut. Wires from the switching box extend through the opening in the coupling and into the conduit.

The above-described assembly provides the advantage of utilizing an inexpensive flexible conduit to protect wires. In a high volume manufacturing process, however, requiring workers to fully rotate the conduit into full engagement with the completely threaded boss of the coupling is time consuming. Such rotation or twisting also is undesirable since requiring workers to perform such motion for an extended period of time could result in injuries such as carpel tunnel type injuries.

Accordingly, it is desirable and advantageous to provide an assembly for protecting motor components and leads extending between a motor shell and an external power source or control box housing which is inexpensive and easy to assemble. It is also desirable and advantageous to provide an assembly which is flexible so as to allow use of one assembly in many motor configurations for protecting such leads.

An object of the present invention is to provide an inexpensive and easy to manufacture and install assembly for substantially preventing water, dirt and oil from passing through the notch and into the motor and for protecting the leads for the entire lead length between the motor shell and control unit or power source housing.

Another object of the present invention is to provide a motor lead protection assembly which is flexible and can be used in many motor configurations.

Yet another object of the present invention is to provide a fitting for insertion into the notch formed in the motor shell and which is not easily separated from a flexible conduit having the motor leads extending therethrough.

SUMMARY OF THE INVENTION

These and other objects of the invention are attained in an assembly constructed in accordance with the present invention. In carrying out various objects of the present invention in one form thereof, a fitting is provided that includes an integrally formed boss and a notch interfitting portion. An opening is formed in and extends through the boss and interfitting portion. The opening is sized to have motor leads extend therethrough. A groove is formed in the interfitting portion and is sized to have inserted therein a portion of the shell wall adjacent the notch formed in the motor shell. In one embodiment, the outer diameter of the fitting boss is sized to be inserted in a flexible conduit such as Carflex non-metallic conduit. The boss is constructed so that once inserted within the conduit, the boss and the conduit are not easily separated. For example, protuberances in the form of spaced apart partial threads, ridges, rings, or barbs, or some combination thereof, may be formed on the exterior surface of the boss.

The notch is formed in the motor shell so that at least a portion of the notch is bound by the motor endshield. One end of the motor leads, which are connected at the other end to the motor stator, are inserted into and pulled through the fitting opening. The present fitting is then inserted into the notch, prior to connecting the motor endshield to the shell, so that the edges of the notch are disposed within the fitting groove. The motor endshield is then attached to the motor shell.

The ends of the motor leads passed through the fitting opening are then inserted into the passageway at a first end of the flexible conduit. The motor leads are pushed through the conduit so that the ends of the leads extend from a second end of the conduit. The first end of the conduit is then attached to the fitting boss by sliding the first end over the outer surface of the boss, including over the protuberances formed on the boss. The second end of the conduit may be routed to the motor control box or power source. The leads typically extend from the second end of the conduit into the control box or power source housing. The flexible conduit can be pre-cut so that the end of the conduit is disposed against an outer wall of the control unit or power source housing or inserted into an opening formed in such housing.

The above described fitting and conduit are resistant to water, dirt and oil and substantially prevent such elements from entering into the motor through the notch formed in the motor shell. The fitting and conduit also are firmly connected so as to withstand forces acting to separate the fitting and conduit, even at elevated operating temperatures. Such engagement is provided without requiring workers to perform any substantial twisting or rotation and is suitable for high volume manufacturing applications. The present construction also is less expensive than other known constructions, particularly since low cost, commercially available plastic conduit can be utilized. Since the motor leads are protected by the flexible conduit along the entire lead length between the fitting and the control unit or power source housing, the motor cost can further be reduced by using thinner lead insulation.

BRIEF DESCRIPTION OF THE DRAWINGS

FIG. 1 is a partial perspective view, with parts broken away, of an electric motor embodying the present invention in one form thereof;

FIG. 2 is a top plan view of the fitting illustrated in FIG. 1;

FIG. 3 is a side view of the fitting along line 3—3 shown in FIG. 2;

FIG. 4 is an end view of the fitting along line 4—4 shown in FIG. 3;

FIG. 5 is a cross-sectional view of the fitting through line 5—5 shown in FIG. 2; and FIG. 6 is a side view, in cross-section and with parts broken away, of the fitting disposed in a motor shell notch, held in place by a motor endshield, and engaged to a conduit.

DETAILED DESCRIPTION OF THE DRAWINGS

FIG. 1 is a partial perspective view, with parts broken away, of an electric motor embodying the present invention in one form thereof. Particularly, a motor shell 10 and a fitting 12 inserted within a rectangular-shaped notch (not shown in FIG. 1) formed in shell 10 are illustrated. Fitting 12 includes a conduit engagement boss 14 and a notch interfitting portion 16. Protuberances are provided on boss 14 in the form of partial threads 18 and 20. Interfitting portion 16 includes a first rectangular-shaped member 22 disposed against an outer, or external, surface of shell 10 and a second rectangular-shaped member 24 disposed within the motor housing and shown by hidden lines. An opening 26 extends through boss 14 and locking portion 16.

Motor leads 28A–C, having respective terminal clips 30A–C on one end thereof extend from the motor stator (not shown in FIG. 1) through fitting 12 and through an external conduit 32 having a passage 34. For illustration purposes, conduit 32 is not shown in FIG. 1 as being engaged to fitting 12. It should be understood, however, that conduit 32 is engaged to fitting 12 after inserting leads 28A–C through conduit passage 34.

More particularly, the diameter of the outer surface of boss 14 is sized to be inserted into, and fit tightly against the walls of, passage 34 so that boss 14 and conduit 32 are firmly engaged. Specifically, an end 36 of conduit 32 is forced over the outer surface of boss 14 and threads 18 and 20 so that end 36 is adjacent external member 22. An end portion 38 of boss 16 is chamfered so as to facilitate sliding conduit 32 over boss 14 as described above. The contraction forces of conduit 32 against boss 14 and friction forces created between threads 18 and 20 and conduit 32 firmly maintain conduit 32 in place relative to boss 14.

Fitting 12, in the one form illustrated, is formed by injection molding using a plastic such as Valox DR51 or Valox 325, available from GE Plastics, One Plastic Avenue, Pittsfield, Mass., 01201. Conduit 32 can be commercially available conduit such as the Carflex or Liqua-tite conduit hereinbefore described. Conduit 32 preferably is flexible to facilitate protecting the entire motor lead length between fitting 12 and the motor control box or power source housing (not shown).

FIG. 2 is a top plan view of fitting 12 illustrated in FIG. 1. As shown in FIG. 2, external member 22 and internal member 24 have surfaces 40 and 42, respectively, which are curved so as to facilitate surface to surface contact between surfaces 40 and 42 and motor shell 10. An intermediate portion 44 is formed between external member 22 and internal member 24. Crushable projections 46A–D are disposed on the upper surface of intermediate portion 44 which faces an endshield (not shown).

FIG. 3 is a side plan view of fitting 12 along line 3—3 shown in FIG. 2. As shown in FIG. 3, and at an upper section of interfitting portion 16, internal member 24 is stepped relative to intermediate portion 44, and intermediate portion 44 is stepped relative to external member 22. At a lower section of interfitting portion 16, external member 22 and internal member 24, along with intermediate portion 44, define a groove 48 sized to receive a portion of the wall of motor shell 10 defining the notch therein.

FIG. 4 is an end view of fitting 12 along line 4—4 in FIG. 3 and illustrates from another perspective the relative position of external member 22 and internal member 24. As shown in FIG. 4 in hidden line, groove 48 extends along the periphery of internal member 24.

FIG. 5 illustrates, in cross-section, fitting 12 through line 5—5 of FIG. 2. As easily seen in FIG. 5, opening 26 extends the entire length of fitting 12. Opening 26 typically is sized to have at least three motor leads extend therethrough.

FIG. 6 is a side view, in cross section and with parts broken away, of fitting 12 disposed within a notch 50 formed in motor shell 10. Conduit 32 is engaged to fitting 12 and motor leads 28A–C are illustrated as extending from a motor stator 52 through opening 26 and into conduit passage 34. Walls of shell 10 defining notch 50 are disposed within groove 48. Surfaces of a motor endshield 54 contact surfaces of external member 22 and intermediate portion 44 of fitting 12. Crushable projections 46A–D (not visible in FIG. 6) are deformed, or crushed, as the endshield 54 is tightened against shell 10. Surfaces of endshield 54 and shell 10 firmly hold fitting 12 in place.

Although not shown in FIG. 6, flexible conduit 32 extends along the entire length of leads 28A–C between fitting 12 and the control unit or power source housing. Leads 28A–C terminate, for example, in a motor control unit or a power source. Conduit 32 could couple to the motor control unit or power source housing by mating with a coupler or could be inserted into an opening formed in the housing.

The one form of the present invention as described above protects the motor components from adverse external conditions by substantially preventing water, dirt and oil from passing through notch 50 and into the motor. The tight fit between endshield 54 and the upper surface of intermediate portion 44 having crushable projections 46A–D and the tight fit between groove 48 and the walls of shell 10 defining notch 50 substantially prevent water, dirt and oil from entering into the motor at the periphery of notch 50. The tight fit between boss 14 and conduit 32 also substantially prevents water, dirt and oil from entering into the motor through fitting opening 26.

In addition, flexible conduit 32 protects leads 28A–C and extends along the entire length of such leads 28A–C between fitting 12 and the external unit housing. Conduit 32 enables flexible protection of motor leads 28A–C so that, for example, the motor and motor control unit or power source can be located at most desirable locations.

Fitting 12 and conduit 34 also are less expensive to manufacture than other known alternatives. The easy step of inserting fitting 12 into notch 50 is much less time consuming and less complex than forming a terminal block assembly. Also, since conduit 32 is commercially available plastic conduit which can be purchased in high quantities, conduit 32 is much less expensive and far more flexible than plastic molded conduit. Conduit 32 further enables use of thinner lead insulation. This is possible since motor leads 28A–C are protected along the lead length by conduit 32 as discussed above. Such protection enables use of thinner and less expensive lead insulation.

Another important aspect of the present invention is that in manufacturing, conduit 32 can be quickly and easily inserted over boss 14 simply by a direct pushing or slight twisting motion. This easy assembly eliminates the problem of having to fully rotate, a number of times, a conduit to make the engagement between a boss and a conduit. This easy assembly is provided without making a great sacrifice in the reliability of the engagement between boss 14 and conduit 32. Specifically, protuberances such as threads 18 and 20 provide that conduit 32 is not easily separated from boss 14, even at elevated operating temperatures.

From the preceding description of one embodiment of the present invention, it is evident that the objects of the invention are attained. Although the invention has been described and illustrated in detail, it is to be clearly understood that the same is intended by way of illustration and example only and is not to be taken by way of limitation.

For example, rather than threads 18 and 20 being formed on boss 14, other forms of protuberances could be utilized. Such forms could be, for example, barbs, ridges or rings formed on boss 14 so as to provide resistance against separation of conduit 32 from fitting 12. It also is contemplated that boss 14 could be tapered so as to facilitate forcing conduit 32 over boss 14. Moreover, rather than inserting boss 14 into conduit 32, it is possible to size conduit 32 and boss 14 so that conduit 32 could be inserted into boss 14. In addition, fitting 12 could be manufactured from a variety of insulating materials such as hard rubber and is not necessarily limited to being manufactured from plastic. Also, notch 50 formed in motor shell 10 could be some other shape, such as u-shaped, rather than rectangular, and in such event, interfitting portion 16 of fitting 12 would be of u-shaped. Accordingly, the spirit and scope of the invention are to be limited only by the terms of appended claims.

What is claimed is:

1. A dynamoelectric machine configured for having a separate flexible conduit attached thereto, said machine comprising a shell, an endshield engaged to said shell at one end thereof, at least one lead connected to a component disposed within said shell, a notch formed in said shell, a fitting disposed within said notch and held in place by said shell and said endshield, a surface of said fitting having crushable projections thereon in contact with a surface of said endshield, said fitting further comprising a boss, an opening formed in said fitting through said boss, the opening being sized to have said lead inserted therethrough, said boss being sized to be removably inserted within one end of the separate flexible conduit so that said lead can extend through the opening in said fitting and into the separate flexible conduit, said boss including at least one protuberance to provide resistance to separation of said boss from the separate flexible conduit placed thereon.

2. A dynamoelectric machine in accordance with claim 1 wherein said notch formed in said shell is bound on one side by a surface of said endshield, surfaces of said shell and said fitting and surfaces of said endshield and said fitting being in firm contact.

3. A dynamoelectric machine in accordance with claim 1 wherein said fitting includes a groove having the edge of the wall of said shell forming said notch inserted therein.

4. A dynamoelectric machine in accordance with claim 1 wherein the conduit is a plastic, non-metallic conduit.

5. A dynamoelectric machine in accordance with claim 1 wherein said at least one protuberance is a machine element selected from the group consisting of partial threads, ridges, rings, and barbs.

6. A fitting for coupling a separate flexible conduit to a motor, the motor including a shell, an endshield, a stator having at least one winding, and at least one lead connected at one end to the stator winding, a notch being formed in the shell of the motor, said fitting comprising:

a notch interfitting portion configured to be inserted into the motor shell notch and held in place by the motor shell and the motor endshield, said notch interfitting portion comprising crushable projections formed on one surface thereof for engagement by a surface of the endshield;

a boss adapted to be removably engaged to the conduit, said boss adapted to be resistant to separation from the conduit; and said interfitting portion and said boss having an opening extending therethrough, the opening being sized to have the leads extend therethrough.

7. A fitting in accordance with claim 6 wherein said notch interfitting portion comprises a groove adapted to have the edge of the wall of the shell forming the notch inserted therein.

8. A fitting in accordance with claim 6 wherein said boss includes at least one protuberance to provide resistance to separation of said boss from a conduit placed thereon.

9. A fitting in accordance with claim 6 wherein the conduit is a plastic, flexible conduit and said boss is sized to be inserted into one end of a conduit.

10. A dynamoelectric machine configured to couple to a separate flexible conduit, said machine comprising a shell, an endshield engaged to said shell at one end thereof, at least one lead connected to a component disposed within said shell, a notch formed in said shell and bound on one side by a surface of said endshield, a fitting for coupling to the flexible conduit and comprising a notch interfitting portion inserted into said motor shell notch and held in place by said motor shell and said motor endshield, said notch interfitting portion comprising crushable projections formed on one surface thereof for engagement by a surface of said endshield, said fitting further comprising a boss adapted to be removably engaged to one end of the flexible conduit, said notch interfitting portion and said boss being integral and having an opening extending therethrough, the opening being sized to have said lead extend therethrough.

11. A dynamoelectric machine in accordance with claim 10 wherein said interfitting portion of said fitting comprises a groove, said groove being inserted in the edge of the walls of said shell forming said notch.

12. A dynamoelectric machine in accordance with claim 10 wherein the flexible conduit is a plastic, non-metallic conduit and said boss is sized to be inserted into one end of the conduit.

13. A dynamoelectric machine in accordance with claim 10 wherein said boss includes at least one protuberance which is a machine element selected from the group consisting of partial threads, ridges, rings, and barbs.

14. An electric motor configured for having a separate flexible conduit attached thereto, said motor comprising a stator having at least one winding, at least one lead connected at one end to said stator winding, a shell, an endshield engaged to said shell at one end thereof, a notch formed in said shell, a fitting comprising an interfitting portion having an external member and an internal member, said fitting further comprising an intermediate portion being disposed between said external member and said internal member, said external member and said internal member forming a groove at a lower section of said interfitting portion, said groove having a portion of the wall of said motor shell inserted therein, crushable projections on an upper surface of said intermediate portion being engaged to said endshield, said fitting further comprising a boss integral with and extending from said interfitting portion, an opening formed in said fitting through said boss and said interfitting portion, the opening being sized to have said lead inserted therethrough, said boss being sized to be removably engaged to the separate flexible conduit so that said lead can be inserted through the fitting opening and into the separate flexible conduit, said boss including at least one protuberance to provide resistance to separation of said boss from the separate flexible conduit placed thereon.

15. A motor in accordance with claim 14 wherein said internal member is stepped relative to said external member at an upper section of said interfitting portion.

16. A motor in accordance with claim 14 wherein said external member and said internal member each have at least one radial surface disposed in substantial surface to surface contact with said motor shell.

17. A motor in accordance with claim 14 wherein the conduit is a plastic, non-metallic conduit and said boss is sized to be inserted into one end of the conduit.

18. A motor in accordance with claim 14 wherein said at least one protuberance is a machine element selected from the group consisting of partial threads, ridges, rings, and barbs.

19. A fitting for coupling a separate flexible conduit to an electric motor, the motor comprising a stator having at least one winding, at least one lead connected at one end to the stator winding, a shell, an endshield engaged to the shell at one end thereof, and a notch formed in the shell, said fitting comprising an interfitting portion having an external member and an internal member, said fitting further comprising an intermediate portion disposed between said external member and said internal member, said external member and said internal member forming a groove at a lower section of said interfitting portion, said groove configured to have a portion of the wall of the motor shell inserted therein, an upper surface of said intermediate portion configured to be engaged to the endshield, said fitting further comprising a boss integral with and extending from said interfitting portion, an opening formed in said fitting through said boss and said interfitting portion, the opening being sized to have the lead inserted therethrough, said boss being sized to be removably engaged to the separate flexible conduit so that the lead can be inserted through the opening and into the separate flexible conduit, said boss including at least one protuberance to provide resistance to separation of said boss from the separate flexible conduit placed thereon.

20. A fitting in accordance with claim 19 wherein said internal member is stepped relative to said external member at an upper section of said interfitting portion.

21. A fitting in accordance with claim 19 wherein said external member and said internal member each have at least one radial surface configured to be disposed in substantial surface to surface contact with the motor shell.

22. A fitting in accordance with claim 19 wherein crushable projections are disposed on the upper surface of said intermediate portion.

23. A fitting in accordance with claim 19 wherein the conduit is a plastic, non-metallic conduit and said boss is sized to be inserted into one end of the conduit.

24. A fitting in accordance with claim 19 wherein said at least one protuberance is a machine element selected from the group consisting of partial threads, ridges, rings, and barbs.

* * * * *